(12) United States Patent
Stein

(10) Patent No.: US 12,270,940 B2
(45) Date of Patent: Apr. 8, 2025

(54) METHOD FOR DETECTING LOST IMAGE INFORMATION, CONTROL APPARATUS FOR CARRYING OUT A METHOD OF THIS KIND, DETECTION DEVICE HAVING A CONTROL APPARATUS OF THIS KIND AND MOTOR VEHICLE HAVING A DETECTION DEVICE OF THIS KIND

(71) Applicant: Daimler Truck AG, Leinfelden-Echterdingen (DE)

(72) Inventor: Fridtjof Stein, Ostfildern (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 75 days.

(21) Appl. No.: 17/928,202

(22) PCT Filed: Apr. 15, 2021

(86) PCT No.: PCT/EP2021/059798
§ 371 (c)(1),
(2) Date: Nov. 28, 2022

(87) PCT Pub. No.: WO2021/239322
PCT Pub. Date: Dec. 2, 2021

(65) Prior Publication Data
US 2023/0221411 A1    Jul. 13, 2023

(30) Foreign Application Priority Data

May 28, 2020 (DE) ...................... 10 2020 003 218.4

(51) Int. Cl.
*G06V 10/141*   (2022.01)
*B60Q 1/02*    (2006.01)
(Continued)

(52) U.S. Cl.
CPC .............. *G01S 7/4808* (2013.01); *B60Q 1/02* (2013.01); *G01S 7/4865* (2013.01); *G01S 7/487* (2013.01);
(Continued)

(58) Field of Classification Search
None
See application file for complete search history.

(56) References Cited

U.S. PATENT DOCUMENTS

2016/0253883 A1\* 9/2016 Westmacott ........... H04N 7/181
348/159
2016/0350601 A1\* 12/2016 Grauer ................. G06V 10/803
(Continued)

FOREIGN PATENT DOCUMENTS

WO    WO 2017/009848 A1    1/2017

OTHER PUBLICATIONS

PCT/EP2021/059798, International Search Report dated Jul. 16, 2021 (Two (2) pages).

*Primary Examiner* — Eileen M Adams
(74) *Attorney, Agent, or Firm* — Crowell & Moring LLP

(57) ABSTRACT

A method for detecting lost image information via a lighting device and an optical sensor. The lighting device and the optical sensor are controlled so as to be chronologically aligned with each other. A visible spacing region in an observation region of the optical sensor is determined from the chronological alignment of the control of the lighting device and the optical sensor. A recording of the observation region with the optical sensor is generated via the aligned control. Image information is identified in the recording in regions outside of the spacing region visible in the image, so as to make the identified image information accessible.

9 Claims, 2 Drawing Sheets

(51) Int. Cl.
  G01S 7/48    (2006.01)
  G01S 7/4865  (2020.01)
  G01S 7/487   (2006.01)
  G01S 17/894  (2020.01)
  G06V 10/147  (2022.01)
  G06V 10/50   (2022.01)
  G06V 10/70   (2022.01)
  G06V 20/58   (2022.01)
  H04N 23/74   (2023.01)

(52) U.S. Cl.
  CPC .......... *G01S 17/894* (2020.01); *G06V 10/141* (2022.01); *G06V 10/147* (2022.01); *G06V 10/507* (2022.01); *G06V 10/70* (2022.01); *G06V 20/58* (2022.01); *H04N 23/74* (2023.01)

(56) References Cited

U.S. PATENT DOCUMENTS

| | | | |
|---|---|---|---|
| 2017/0052065 A1 | 2/2017 | Sharma et al. | |
| 2017/0234976 A1 | 8/2017 | Grauer et al. | |
| 2018/0125450 A1* | 5/2018 | Blackbourne | A61B 8/0891 |

* cited by examiner

METHOD FOR DETECTING LOST IMAGE INFORMATION, CONTROL APPARATUS FOR CARRYING OUT A METHOD OF THIS KIND, DETECTION DEVICE HAVING A CONTROL APPARATUS OF THIS KIND AND MOTOR VEHICLE HAVING A DETECTION DEVICE OF THIS KIND

BACKGROUND AND SUMMARY OF THE INVENTION

The invention relates to a method for detecting lost image information, a control apparatus for carrying out a method of this kind, a detection device having a control apparatus of this kind and a motor vehicle having a detection device of this kind.

A method proceeds from the international patent application having the publication number WO 2017/009848 A1 in which a lighting device and an optical sensor are controlled in a manner chronologically aligned with each other in order to record a determined visible spacing region in an observation region of the optical sensor, wherein the visible spacing region results from the chronological alignment of the lighting device and the optical sensor. A detection of image information occurs in the recordings only in the visible spacing region. Retroreflecting objects are over-exposed in this region, however, and cannot be read via software technology in the event of traffic signs. An evaluation of the image regions of the recordings that do not correspond to the visible spacing region is not known.

The object of the invention is therefore to create a method for detecting lost image information, a control apparatus equipped to carry out a method of this kind, a detection device having a control apparatus of this kind and a motor vehicle having a detection device of this kind, wherein the disadvantages given are at least partially relieved, preferably avoided.

The object is in particular solved by creating a method to detect lost image information by means of a lighting device and the optical sensor. The lighting device and the optical sensor are here controlled in a manner chronologically aligned with each other. A local position of a visible spacing region in an observation region of the optical sensor is here given via the chronological alignment of the control of the lighting device and the optical sensor. A recording of the observation region is recorded with the optical sensor by means of the aligned control. Finally, image information is sought in the recording in the regions outside of the spacing region visible in the image. If image information is found in the recording in the regions outside of the spacing region visible in the image, then this image information is detected and made accessible. "Make accessible" is here in particular understood to mean that the detected image information is transferred to a control apparatus for further processing and/or usage during autonomous driving, or the control apparatus is otherwise made available.

It is advantageously possible to detect objects outside of the visible spacing region and to provide the corresponding information to the vehicle in which the method is carried out by means of the method suggested here. The detection and recognition of retroreflecting traffic signs that have a particular fluorescing and/or phosphorescing effect is in particular possible with great precision. This is in particular possible because the traffic signs absorb light photons of the lighting due to a photoluminescent property, and emit these photons again over a particular time frame, in particular up to a few seconds, after the end of the lighting. The retroreflecting traffic signs having a photoluminescent property when directly lit, i.e., if they are in the visible spacing region, are thus over-exposed via the additional reflecting effect, and thus cannot be read by means of software technology. As soon as the traffic signs are no longer within the visible spacing region, the photoluminescent effect comes into effect, and the traffic signs are clearly depicted in the recording of the optical sensor via the emitted photons. The method is advantageously also suitable for recognising bicycles having photoluminescent components and people having photoluminescent clothing.

The method can particularly advantageously be used in automated vehicles, in particular automated trucks. Traffic signs or other traffic participants can be advantageously detected by means of the method, in particular when driving at night. The method enables a timely and suitable reaction to the detection of the traffic signs and the other traffic participants. A suitable reaction of this kind can for example be a speed reduction, an emergency braking, or following an avoidance trajectory—determined ad hoc in some cases.

The method for generating recordings by means of a control of a lighting device and optical sensor chronologically aligned with each other is a method known as a gated imaging method; the optical sensor is in particular a camera that is only sensitively wired in a particular, limited time window, which is described as "gated control", and the camera is thus a gated camera. The lighting device is also correspondingly only controlled chronologically within a particular selected time interval, in order to light up a scenery on the object.

A predetermined number of light impulses is in particular emitted via the lighting device, preferably having a duration between 5 ns and 20 ns. The beginning and the end of the exposure of the optical sensor is coupled with the number and duration of the emitted light impulses. Resulting from this, a determined visible spacing region can be recorded via the optical sensor via the chronological control of the lighting device on the one hand, and on the other of the optical sensor having a correspondingly defined local position, i.e., in particular a determined spacing of the beginning of the spacing region from the optical sensor and a defined spacing region width.

The visible spacing region is here the region on the object in three-dimensional space that is depicted via the number and duration of the light impulses of the lighting device in connection with the start and the end of the lighting of the optical sensor by means of the optical sensor in a two-dimensional recording of an image plane of the optical sensor.

The observation region, by contrast, is in particular the region on the object in three-dimensional space that could be depicted by means of the optical sensor in a two-dimensional recording in total—in particular at maximum—when there is sufficient lighting and exposure of the optical sensor. The observation region in particular corresponds to the entire image region of the optical sensor that can be lit that could theoretically be exposed. The visible spacing region is thus a partial quantity of the observation region in actual space.

The observation region in the image corresponds to all the image lines present on the optical sensor. The spacing region visible in the image is given as a partial region of the image plane in particular between a start image line and an end image line. The start image line determines the beginning of the visible spacing region in the recording. The end image line further determines the end of the visible spacing region in the recording.

When the term "on the object" is used here and in the following, a region in actual space is meant, i.e., on sides of the object to be observed. When the term "in the image" is used here and in the following, a region on the image plane of the optical sensor is meant. The observation region and the visible spacing region are here given on the object. Assigned regions in the image on the image plane correspond to said observation region and spacing region via the imaging laws and the chronological control of the lighting device and the optical sensor.

Light impulse photons hit the optical sensor depending on the start and end of the exposure of the optical sensor after the lighting begins via the lighting device. The further away the visible spacing region is from the lighting device and the optical sensor, the longer the chronological duration is before a photon that is reflected in this spacing region hits the optical sensor. The chronological spacing between an end of the lighting and a beginning of the exposure thus extends the further away the visible spacing region is from the lighting device and the optical sensor.

According to an embodiment of the method, it is in particular possible to define the position and spatial breadth of the visible spacing region via a corresponding suitable choice of the chronological control of the lighting device on the one hand and the optical sensor on the other.

In an alternative embodiment of the method, the visible spacing region can be predefined, wherein, from the latter, the chronological alignment of the lighting device on the one hand and the optical sensor on the other is determined and correspondingly predefined.

An image line is here in particular understood as the quantity of all the image points of a recording in the image plane of the optical sensor that lie on a shared horizontal line in the image plane.

The detection of image information, in particular photoluminescent objects, is in particular used on all image lines that do not lie between the start image line and the end image line.

The lighting device is a laser in a preferred embodiment. The optical sensor is a camera in a preferred embodiment.

It is provided according to a development of the invention that a line histogram is created over all the image lines allocated to an evaluation region in the observation region on the optical sensor by means of summation of the lighting intensities per image line of the optical sensor for the recording of the spacing region. The start image line and the end image line are then determined by means of the line histogram. The regions in the image outside of the spacing region in the image are thus determined. This advantageously enables the determining of the image location of the region on the optical sensor assigned to the visible spacing region on the object in the image. A clear brightness transition at the beginning of the spacing region in the image and at the end of the spacing region in the image thus actually results from the chronological control of the lighting device on the one hand and the optical sensor on the other. This finally enables the determining of the regions outside of the spacing region visible in the image in which image information is sought, in particular of photoluminescent objects.

A line histogram is in particular understood to mean that the individual image lines of the optical sensor in the evaluation region are assigned to the sum of the lighting intensities over all image points of the respective image line lying in the evaluation region. In this way, the corresponding brightness transition created via the chronological control can be very easily and safely detected in the image plane of the optical sensor.

The evaluation region is identical to the observation region according to a preferred embodiment. This corresponds to an embodiment of the method that is particularly easy to implement. It is also possible, however, that the evaluation region is selected in a smaller form than the observation region according to a different preferred embodiment, in particular as a region of interest in which the objects to be detected can be located. This advantageously enables a quicker and more efficient execution of the method. The evaluation region can in particular also be horizontally limited, as only the image points lying in the evaluation region are included in the summation.

The evaluation region is preferably identified in the recording before the line histogram is calculated via a GPS preview, in particular using back projection of the course of the road in the image plane and/or via a method for optical lane tracking.

It is provided according to a development of the invention that the search for and detection of the image information is carried out by means of a pattern recognition algorithm.

It is provided according to a development of the invention that the search for and detection of the image information is carried out by means of deep learning.

It is provided according to a development of the invention that the detected image information is restored and saved. It is thus in particular possible to show the detected image information in combination with the recording to the driver. The detected image information is preferably saved in the case of autonomous vehicles in order to be able to track the reactions of the vehicle after the journey.

It is provided according to a development of the invention that two recordings, specifically a first recording and a second recording, are recorded with the optical sensor by means of two differently chronologically aligned controls of the lighting device and the optical sensor. The first recording, the second recording and the detected image information are combined into a complete recording. The visible spacing regions of the first recording and the second recording preferably do not overlap. A photoluminescent object in the visible spacing region of the first recording is depicted over-exposed in the first recording. The photoluminescent object is advantageously not in the visible spacing region of the second recording. The object can thus be recognised outside of the visible spacing region due to its phosphorescent property. The over-exposed depiction of the object from the first recording is preferably replaced by the depiction of the object from the second recording in the complete recording when the first recording and the second recording are combined. The detected image information is restored in this way in particular.

The object is also solved by creating a control apparatus that is equipped to carry out a method according to the invention or a method according to one of the previously described embodiments. The control apparatus is preferably formed as a computing device, in particular preferably as a computer, or as a control device, in particular as a control device of a vehicle. In connection with the control apparatus, the advantages in particular arise that have already been described in connection with the method.

The object is also solved by creating a detection device that has a lighting device, an optical sensor and a control apparatus according to the invention or a control apparatus according to one of the previously described exemplary embodiments. In connection with the detection device, the advantages in particular arise that have already been described in connection with the method and the control apparatus.

The control apparatus is preferably operatively connected to the lighting device, on the one hand, and to the optical sensor, on the other, and equipped for the control thereof.

The object is finally also solved by creating a motor vehicle having a detection device according to the invention or a detection device according to one of the previously described exemplary embodiments. In connection with the motor vehicle, the advantages in particular arise that have already been described in connection with the method, the control apparatus and the detection device.

In an advantageous embodiment, the motor vehicle is formed as a truck. It is also possible, however, that the motor vehicle is a passenger motor car, a utility vehicle or another motor vehicle.

DETAILED DESCRIPTION OF THE DRAWINGS

Figure 1:
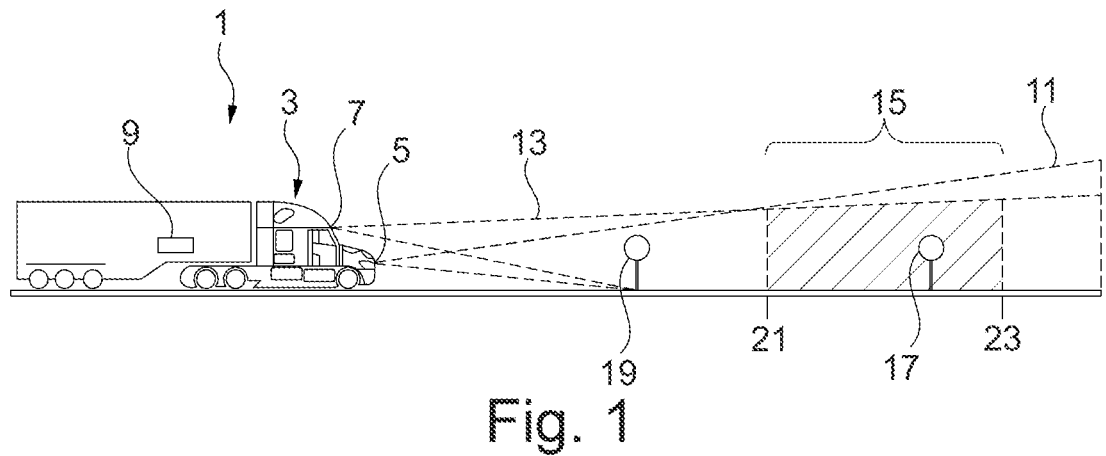
FIG. 1 shows a schematic depiction of an exemplary embodiment of a motor vehicle having an exemplary embodiment of a detection device.

FIG. 1 shows a schematic depiction of an exemplary embodiment of a motor vehicle 1 having an exemplary embodiment of a detection device 3. The detection device 3 has a lighting device 5 and an optical sensor 7. The detection device 3 also has a control apparatus 9 that is only schematically depicted here, and that is operatively connected in a manner not explicitly depicted to the lighting device 5 and the optical sensor 7 for their respective control. A lighting frustum 11 of the lighting device 5 and an observation region 13 of the optical sensor 7 are in particular depicted in FIG. 1.

A visible spacing region 15 is additionally depicted in a hatched manner, said spacing region being a partial quantity of the observation region 13 of the optical sensor 7.

A traffic sign 17 is arranged in the visible spacing region 15. A traffic sign 19 is arranged outside of the visible spacing region 15.

A beginning 21 and an end 23 of the visible spacing region 15 are also indicated in FIG. 1.

The control apparatus 9 is in particular equipped to carry out an embodiment, described in more detail in the following, of a method for detecting lost image information in a recording 25 generated by means of a lighting device 5 and an optical sensor 7.

The lighting device 5 and the optical sensor 7 are here controlled in a manner chronologically aligned with each other, wherein a visible spacing region 15 in the observation region 13 is given from the chronological alignment of the control of the lighting device 5 and the optical sensor 7. A recording of the observation region 13 is recorded with the optical sensor 7 by using the aligned control.

Figure 2:
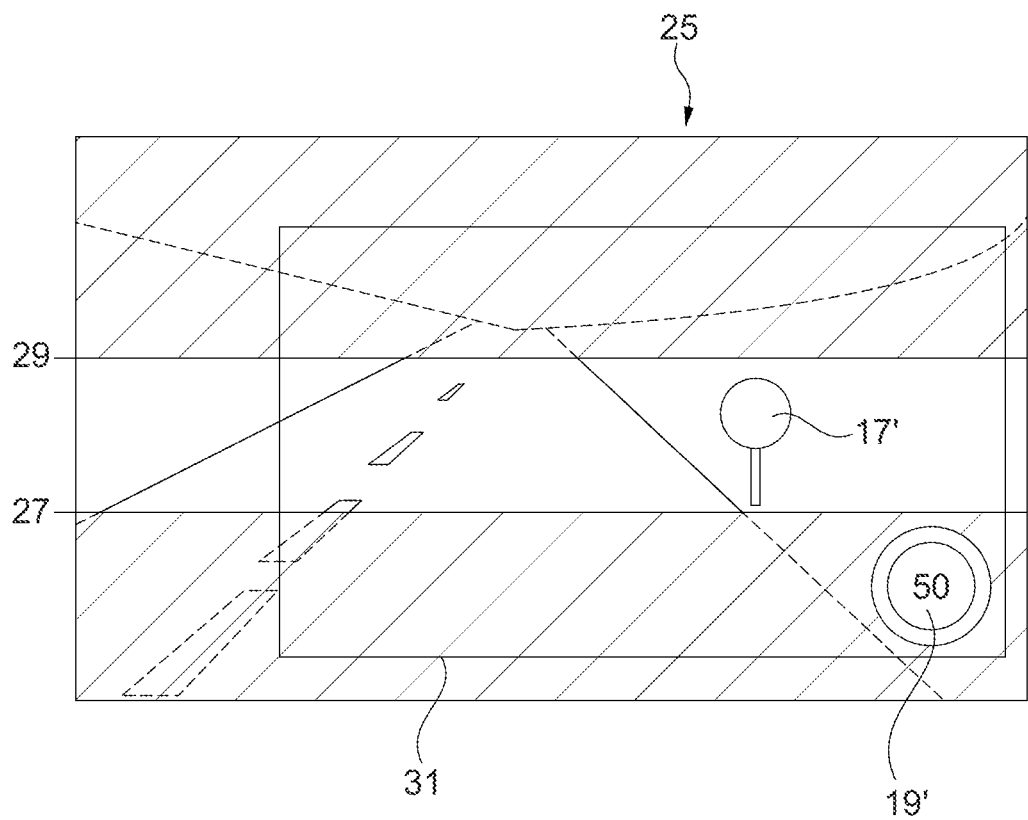
FIG. 2 shows a schematic depiction of a recording that is recorded within an embodiment of the method with an optical sensor.

FIG. 2 shows a schematic depiction of a recording 25 of this kind in an image plane of the optical sensor 7. A start image line 27 for the beginning 21 and an end image line 29 for the end 23 of the visible spacing region 15 in the recording 25 is here depicted in FIG. 2. The images of the traffic signs 17 and 19 are also depicted in the recording 25. The image of the traffic sign 17 is denoted with 17', and the image of the traffic sign 19 is denoted with 19' in the recording 25. No markings can be seen in the image of the traffic sign 17' due to the retroreflecting property of the traffic signs 17 and 19. The traffic sign 19 was located in the visible spacing region on the object a few moments before the recording 25 was created. The markings can be clearly recognised in the image of the traffic sign 19' via the photoluminescent property of the traffic sign 19.

A method for detecting lost image information is then used in the regions above the end image line 29 and below the start image line 27 in order to search for image information, preferably objects having a photoluminescent property. If image information 19' is found then this image information is detected and made available to the control apparatus 9, and thus to the motor vehicle 1 and/or to the driver.

The method for searching for and detecting lost image information is preferably based on pattern recognition or deep learning.

An evaluation region 31 is additionally indicated in FIG. 2 that can in particular be determined via a GPS preview and/or via a method for optical lane tracking. The evaluation region 31 is here smaller as an area of interest than the observation region 13. It can also coincide with said observation region.

Figure 3:
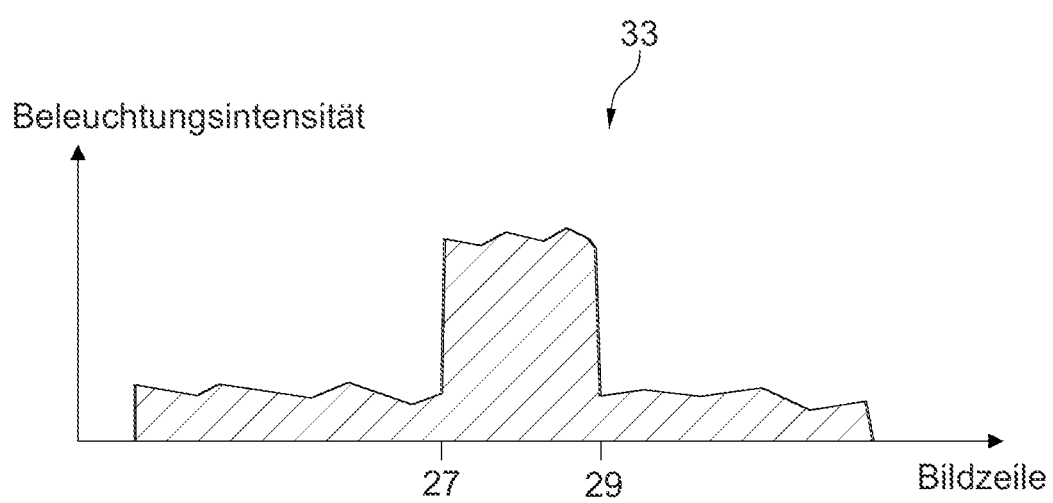
FIG. 3 shows a schematic depiction of a line histogram that is used in an embodiment of the method.

FIG. 3 shows a schematic depiction of a line histogram 33 of the recording 25 according to FIG. 2 or the evaluation region 31 of the recording 25. The individual image lines of the optical sensor 7 are plotted on the abscissa in this line histogram 33, wherein a sum of the lighting intensities per image point over all the image points of the respective image line in the evaluation region 31 is plotted on the ordinates for each image line. This line histogram 33 is created over all the image lines assigned to the evaluation region 31 on the optical sensor 7 by means of summation of the lighting intensities per image line of the optical sensor 7. The start image line 27 and the end image line 29 are then provided by means of the line histogram 33, wherein clear jumps can be recognised in intensity in the start image line 27, on the one hand, and in the end image line 29, on the other, in particular due to the chronologically aligned control of the lighting device 5 and the optical sensor 7.

The invention claimed is:

1. A method for detecting lost image information by means of a lighting device and an optical sensor, comprising:
    controlling the lighting device and the optical sensor so as to be chronologically aligned with each other for image capture;
    determining a visible spacing region in an observation region of the optical sensor from the chronological alignment of the control of the lighting device and the optical sensor, wherein the visible spacing region is the entire portion of the observation region that is illuminated for the image capture via the chronological alignment;
    capturing an image of the observation region with the optical sensor via the aligned control;
    identifying, from the captured image, image information in regions outside of the visible spacing region; and
    making the identified image information accessible to a detection device of a motor vehicle.

2. The method of claim 1, further comprising:
    generating a line histogram is over all the image lines allocated to an evaluation region in the observation region on the optical sensor via a summation of the lighting intensities per image line of the optical sensor for an identification of the spacing region visible in the image;

determining a start image line and an end image line via the line histogram; and identifying the regions outside of the visible spacing region via the start image line and the end image line.

3. The method of claim 1, wherein the search for and the detection of the image information is carried out by means of pattern recognition.

4. The method of claim 1, wherein the search for and the detection of the image information is carried out by means of deep learning.

5. The method of claim 1, wherein the detected image information is restored and saved.

6. The method of claim 1, wherein two images are captured with the optical sensor by means of two differently chronologically aligned controls, and wherein the captured images and the detected image information are combined into a complete image.

7. A control apparatus, comprising:

a processor configured to carry out the method of claim 1.

8. A detection device, comprising:

a lighting device;

an optical sensor; and the control apparatus of claim 7.

9. A motor vehicle, comprising:

the detection device of claim 8.

* * * * *